United States Patent [19]
Heller et al.

[11] 3,798,666
[45] Mar. 19, 1974

[54] RECORDING SYSTEMS

[75] Inventors: Fritz Peter Heller, Bromley; Brian Frederick Smith, Rainham, both of England

[73] Assignee: Elliott Brothers (London) Limited, Chelmsford, England

[22] Filed: July 21, 1972

[21] Appl. No.: 273,975

[52] U.S. Cl............ 95/12.5, 95/12, 350/286, 346/110 R, 352/131
[51] Int. Cl. ............................................. G03b 29/00
[58] Field of Search .......... 95/12.5, 12, 1; 352/131, 352/132, 133, 93; 350/173, 286; 346/107 B, 110 R

[56] References Cited
UNITED STATES PATENTS
2,938,201 5/1960 Thornton............. 352/132 X
3,587,419 6/1971 Blazek............... 95/12.5 X Primary Examiner—Robert P. Griener
Attorney, Agent, or Firm—Kirschstein, Kirschstein, Ottinger & Frank

[57] ABSTRACT

A recording system for a HUD comprises a prism optical system for combining light from the symbol generator and from the scene as viewed by an observer light so that the combined image emitted from the system has the correct orientation, and a camera for mounting on the side of the HUD

5 Claims, 4 Drawing Figures

PATENTED MAR 19 1974 3,798,666

RECORDING SYSTEMS

This invention relates to recording systems for use in conjunction with head-up displays in aircraft.

According to one aspect of the invention there is provided a recording system for an aircraft head-up display unit, comprising an optical system comprising a plurality of co-operating prisms providing two input faces one of which receives light from a display generating device of the unit and the other of which receives light from the scene in an observer's normal field of view, and an output face from which the combined light received by said input faces is emitted in a direction transverse to the longitudinal axis of the display unit, the light being combined by the optical system in such a manner that in an image formed by the combined light said symbols and said scene are in correct relative orientation and a camera mountable at one side of the display unit to receive light from said output face.

According to another aspect of the invention an optical system includes a plurality of co-operating prisms providing two input faces which are arranged to receive light from two direction, respectively, which are at least approximately mutually perpendicular, and an output face from which said light from both said input faces is emitted in a direction at least approximately perpendicular to both the aforesaid directions.

One embodiment of the invention will now be described, by way of example, with reference to the accompanying drawing, in which.

Figure 1:
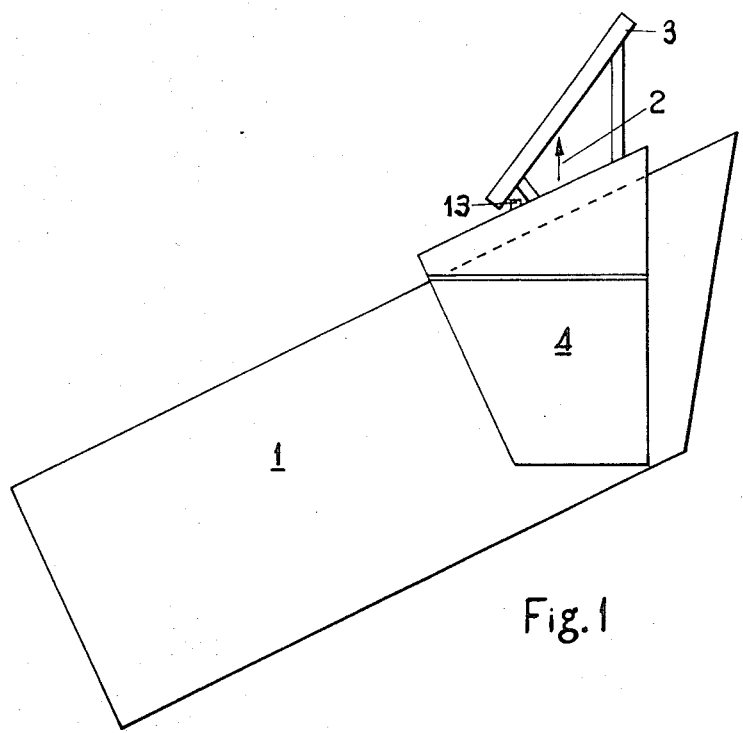
FIG. 1 is a schematic side view of an aircraft head-up display unit to which is attached a recording system in accordance with the invention.

Referring now to FIG. 1 of the drawing, a head-up display unit 1 includes projection apparatus (not shown) arranged to project collimated light along a path, the direction of which is shown generally by the arrow 2, to a combiner 3. The light constitutes an image of symbols for display within the pilot's normal field of view.

Figure 2:
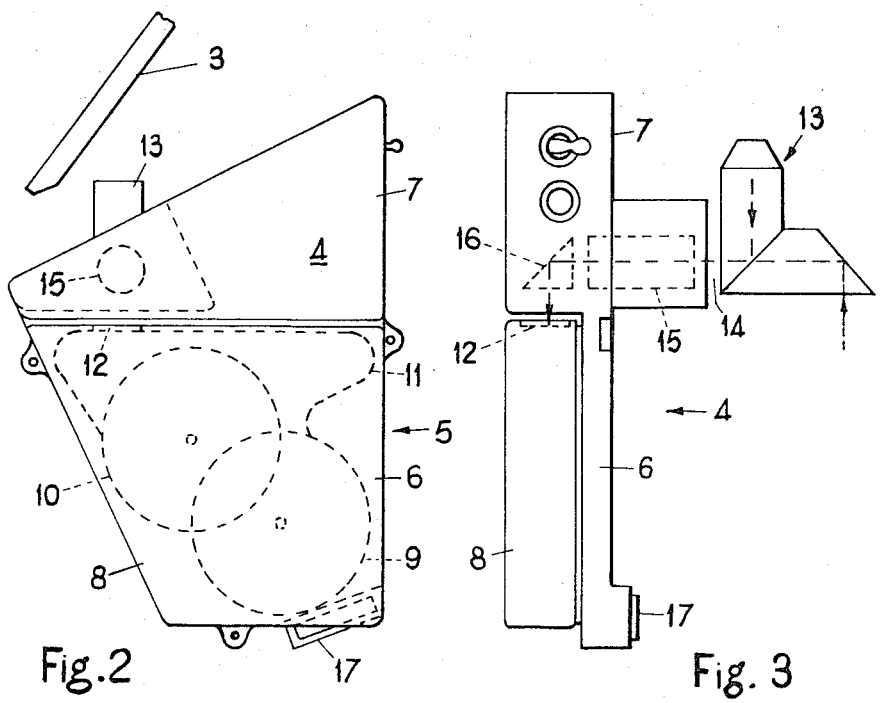
FIG. 2 is a side elevation of a camera forming part of the system.
Figure 3:
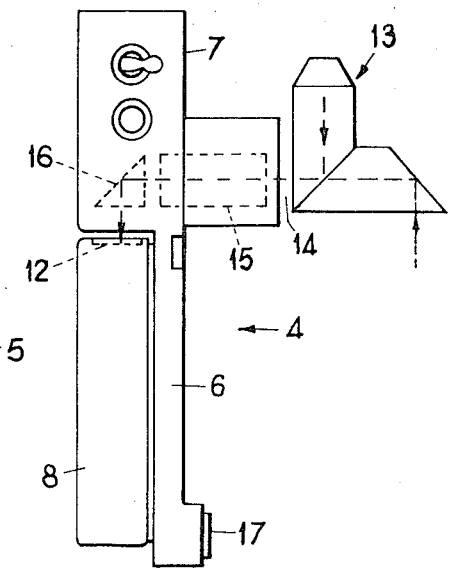
FIG. 3 is an end elevation of the camera.

A camera 4, which is attached to the side of the display unit 1, operates in the manner described below to produce a record of both the display symbols and the events occurring in the "real world" as seen through the aircraft windscreen, a periscope 13 which is shown diagramatically in FIGS. 1 to 3 being arranged to receive light from the path 2 and from the real world scene and to feed a combined image to the camera.

The camera 4 (FIG. 2) has a body 5 which is divided into two compartments 6 and 7. The lower compartment 6 houses a detachable film magazine 8 containing a film feed spool 9 and a take-up spool 10. A film 11 is fed in the fore to aft direction by a claw mechanism (not shown) which is operated from within the upper compartment 7 by a d.c. motor housed in that compartment. The motor is controllable to feed the film either in single frame steps or continuously at, say, 16 frames per second for any period determined by an automatic remote control system or by manual operation of a control switch.

The motor speed is controlled by a servo loop in which the mark/space ratio of the power input to the motor is controlled in accordance with a feedback signal generated by a tachometer coupled to the motor shaft. A rotating shutter in the compartment 7 comprises two sectored discs, the angle between the discs being variable by a servo motor to give exposure times of, say, one fortieth second to one twelve-hundredth second under the control of an automatic exposure logic system. This system may use as its control parameter a signal from an automatic brilliance control in the head-up display unit 1. An adjustable iris is also provided, and this is manually set in dependence upon the emulsion speed of the particular film which is used. Alternatively, the iris may be servoed by the brilliance control and the shutter manually set in accordance with the emulsion speed of the particular film.

An electrically operated, thermostatically-controlled heater is provided on the side of the magazine to enable the camera to operate efficiently at low temperatures. In order to reduce the load variations on the electrical supply, the heater is switched off when the camera motor is running. The thermal mass of the camera and magazine is sufficient to maintain the temperature within the required limits.

The periscope 13 receives light from the path 2 and from the "real world" and produces a composite image of the head-up display symbols superimposed upon the real world image as described below. The collimated light from the periscope follows a path 14 which is substantially perpendicular to the path 2 and substantially parallel to the plane of the gate 12.

A lens system 15 and a mirror or prism 16 mounted in the camera compartment 7 focus and deflect the light from the periscope to form a focused image at the gate 12. As explained below, the periscope 13 is so constructed that the orientation of the head-up display symbols and the orientation of the real world image at the gate 12 are such that subsequent projection of the processed film using a normal projector produces an image which is upright and the right way round and which progresses correctly in a forward direction.

Electrical power supplies and control signals are fed to the camera via a connector 17 mounted on the lower compartment 6.

The camera 4 is generally wedge-shaped in side elevation and is mounted with its top edge parallel to the top surface of the unit 1, i.e., parallel to the "over-nose" line. Although it is shown on the left-hand side of the head-up display unit 1, the camera 4 can readily be designed to fit on the opposite side of the unit. The alignment of the camera in relation to the periscope is not critical, so simple quick-release fasteners are adequate for positioning the camera on the head-up display unit.

Due to its design and positioning on the side of the display unit 1, the camera 4 has many advantages over the conventional type of head-up display recording camera which is mounted at the aft end of the display unit. The conventional camera is mounted transversely to the display unit and so presents a wide obstruction in the pilot's field of view, whereas the above-described camera is positioned outside the field of view. Because the camera is further forward in the present arrangement, the centre of gravity of the display unit is closer to the mounting points of the unit.

The present camera body is relatively narrow, and being positioned with its larger dimensions towards the display unit requires only a minimum amount of instrument panel space.

As explained above, the image at the film gate 12 is correctly orientated and the film is travelling in the correct direction for normal projection. This is not so in some arrangements now is use. All known arrangements have correct orientation of scene and symbology but odd projection attitudes are required and in some cases, projection must be via a mirror.

Since the lens system 15 is contained within the camera 4, the periscope does not need to contain any lenses and the optical system of the camera is therefore complete. The camera can therefore be tested away from the head-up display unit. Furthermore, for the same reason the positioning of the camera relative to the display unit is not critical.

The provision of a film magazine allows the film to be changed readily whilst the aircraft is in flight. The recording time can therefore be readily extended or the film type changed.

Since the camera 4 is mounted closely adjacent the head-up display unit 1, the periscope 13 can be relatively small and rigid and it will not obscure any significant part of the symbols displayed.

Figure 4:
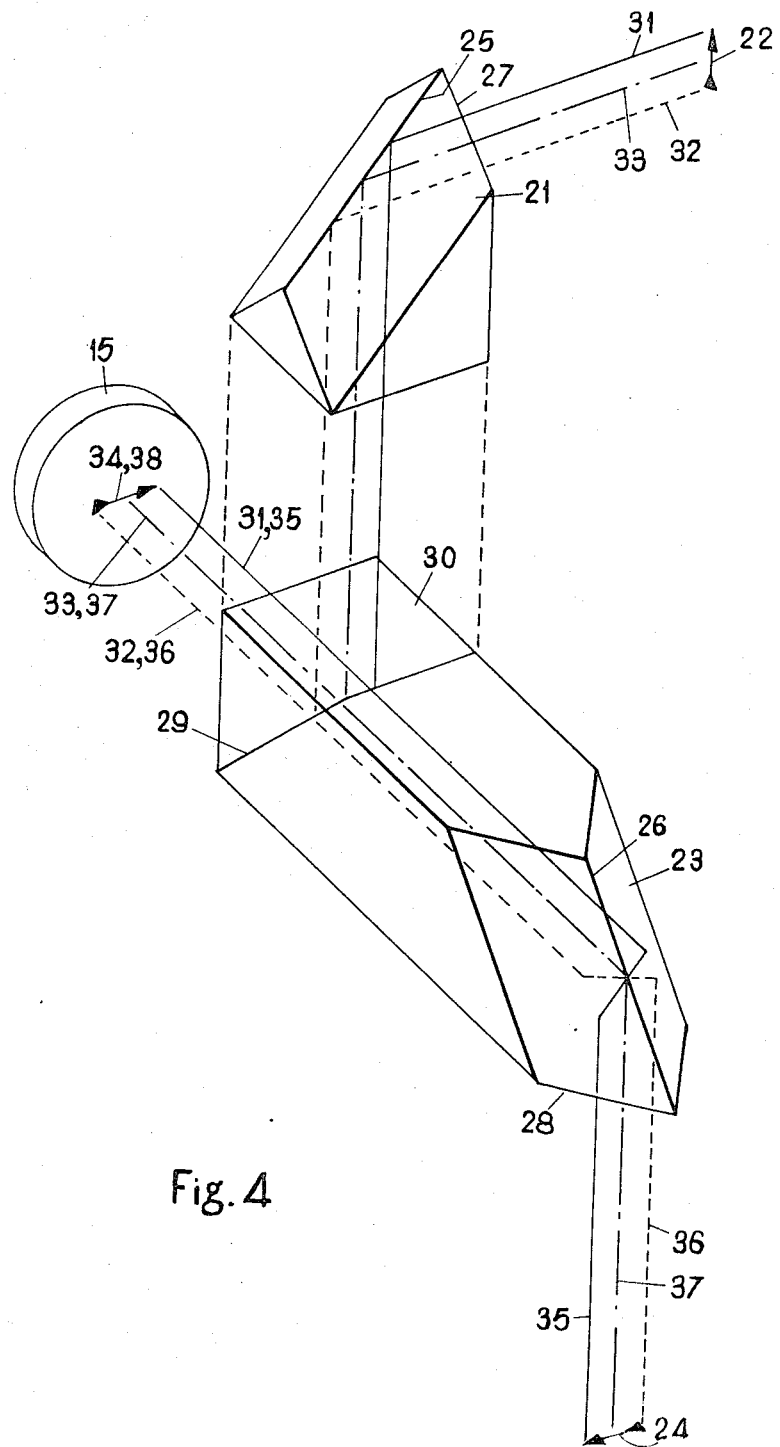
FIG. 4 is a diagrammatic exploded view of a prism arrangement forming part of the system.

Referring now to FIG. 4 of the drawings, the optical system of the periscope 13 comprises an Amici or "roof" prism 21 which receives light from an object in the pilot's field of view. For the sake of clarity in illustrating the orientation of the resultant image, the object is represented by an arrow 22.

A second Amici prism 23 receives light from the path 2 (FIG. 1). For the same reason as above, a symbol to be projected along that path is represented by an arrow 24.

Bonded to the outlet face 29 of the prism 23 is a right angle prism 30, the face 29 and the adjacent face of the prism 30 being coated with a suitable material to allow refkection of light rays received from the prism 21, whilst allowing light rays transmitted through the prism 23 to pass through the surfaces without deviation.

For the sake of clarity in illustrating the paths of light rays in the system, the prism 21 is shown spaced from the prism 30, whereas in practice the two prisms are preferably closely adjacent.

In operation of the optical system, light rays from the object 22, diagrammatically represented by a full line 31 and a dotted line 32 from the extremities of the arrow and a chain dotted line 33 from the centre of the arrow, pass through the face 27 and are reflected downwards by the apex 25 of the prism 21. These rays then impinge upon the surface 29 of the prism 30 where they are deflected through 90° so that they emerge from the end face of the prism 30. It will be seen that a resultant image 34 of the object 22 at the camera lens system 15 is, in effect, rotated axially through 90° relative to the object and is displaced longitudinally through 90° relative to the object.

Light rays from the symbol 24, diagrammatically represented by a full line 35 and a dotted line 36 from the extremities of the arrow and a chain dotted line 37 from the centre of the arrow, pass through the inlet face 28 of the prism 23 and are reflected twice at the "roof" surfaces of the prism. These rays then pass along the body of the prism 23 and through the surface 29 without deviation. For the sake of clarity in the drawing it has been assumed that the symbol 24 is in such a position that the rays 35, 36 and 37 emerge from the prism 30 along the same paths as the rays 31, 32 and 33, respectively. However, there is clearly no need for the two sources of light to be so positioned.

It will be seen that, for the illustrated position of the symbol 24, the resultant image 38 at the camera lens system 15 has axially the same orientation as the image 34.

Clearly the object 22 and the symbol 24 may be replaced by any other shape of object or symbol, respectively, the resultant images being orientated relative to the respective light sources in exactly the same way as explained above. The prism 21 is preferably adjustably mounted adjacent the prism 30 so that the relative positions of the resultant images can be adjusted.

We claim:

1. A recording system for an aircraft head-up display unit, comprising an optical system comprising a plurality of co-operating prisms providing two inlet faces one of which receives light from a device for generating a symbol display of the unit and the other of which receives light from the scene in an observer's normal field of view, and an outlet face from which the combined light received by said inlet faces is emitted in a direction transverse to the longitudinal axis of the display unit, the light being combined by the optical system in such a manner that a single image is formed in which the relative orientation of said symbol display and said scene is the same as seen by the observer and a camera mountable at one side of the display unit to receive light from said outlet face.

2. A recording system according to claim 1, in which the inlet faces of the optical system are arranged to receive light from two directions which are at least approximately mutually perpendicular and the outlet face is arranged to emit light in a direction which is approximately perpendicular to the two aforesaid directions.

3. A recording system according to claim 2, in which the optical system comprises a first roof prism providing one inlet face, a second roof prism providing the other inlet face and a right angle prism, bonded to the first roof prism and positioned adjacent the second roof prism, providing the outlet face.

4. A recording system according to claim 3, in which the abutting faces of the first roof prism and the rectangular prism are coated to reflect light from the second roof prism whilst allowing light from the first roof prism to pass through without deviation.

5. A recording system according to claim 1 in which the camera contains a second optical system including lens means for receiving light from the outlet face and means for directing the light from the lens means along a path approximately perpendicular to the path of the light from the outlet face into a film exposure aperture and means for feeding a film past said aperture.

* * * * *